Nov. 29, 1960 N. H. STARK 2,961,710
METHOD FOR MAKING A FOAMED POLYURETHANE FILTER
Filed Jan. 4, 1957

INVENTOR.
NORMAN H. STARK
BY
Wolfe, Hubbard, Voit & Osann
ATTYS.

United States Patent Office 2,961,710
Patented Nov. 29, 1960

2,961,710

METHOD FOR MAKING A FOAMED POLYURETHANE FILTER

Norman H. Stark, Cedarburg, Wis.
(P.O. Box 175, Grafton, Wis.)

Filed Jan. 4, 1957, Ser. No. 632,410

6 Claims. (Cl. 18—48)

The present invention relates to the manufacture of filters or the like and more particularly to the manufacture of filters for removing solid particles from fluids.

One object of the present invention is to provide a method of manufacturing an improved filter for fluids such as gases or liquids which is highly efficient in its removal of solid particles from such fluids. A more specific object is to provide a method of manufacturing an improved filter of the foregoing type which is especially useful for removing dust and moisture from gases such as air.

Another object of the present invention is to provide a method of manufacturing an improved filter having the foregoing characteristics and which is easily cleaned without affecting its efficacy as a filter.

A further object of the present invention is to provide a method of manufacturing an improved filter of the above type which is economical, simple to manufacture, and which is highly efficient for removing various types of solid impurities from fluids.

Still another object of the present invention is to provide a method of manufacturing an improved filter having the foregoing characteristics which is easily inserted and installed in a filter container, which tightly engages the container walls to prevent channeling of the fluid around the filter, and which is easily removed from and replaced in the container so that it may be cleaned and reused.

Other objects and advantages will become apparent as the following description proceeds. It should be understood that there is no intention to limit the invention to the specific forms and examples disclosed, but on the contrary, the intention is to cover all modifications, alternatives, equivalents and uses falling within the spirit and scope of the invention as expressed in the appended claims.

In the drawing Figure 1 illustrates diagrammatically an illustrative process embodying the present invention.

Figure 1:
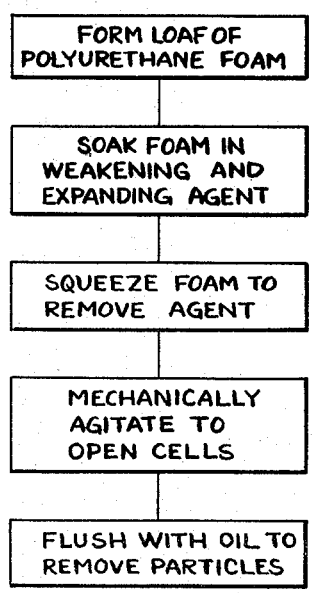

In accordance with the present invention as exemplified by the foregoing objects, an expanded plastic or plastic foam is manufactured which is adapted for use as an improved filter medium. Such foams have a multitude of connecting voids or cells and I have found that they are extremely useful for filtering applications such as air filters for internal combustion engines, filters for air conditioning systems, and filters for liquid or gaseous fuel systems.

I have further discovered that expanded plastics or plastic foams, of which the polyurethane foams are illustrative, when treated in accordance with the present invention are unusually effective and highly efficient as filters. Furthermore, I have discovered that such foams as the polyurethane foams, when treated in accordance with the present invention, possess heretofore unknown properties which enhance their value as filtering agents. In this regard, I have found that polyurethane foams are capable of greater pick-up efficiencies and exhibit a greater affinity for solid and liquid particles entrained in the gas being treated than was heretofore known in filtering agents. Also, foams treated in accordance with the present invention are capable of passing a large volume of gas in a given period of time.

I have also discovered that the expanded plastics or foams, treated in accordance with the present invention and employed for collecting entrained particles or impurities from a gas, can be easily cleaned by flushing with water and without the use of special solvents or procedures. It is important to note that such washing does not spoil the characteristics of my novel plastic foams and decrease their usefulness as filters or treating mediums and that further treatment of the foams is not necessary after they have been washed and before they are to be used for filtering. Accordingly, the treated foams are reusable again and again even though they are periodically washed and cleaned.

The expanded plastic foams, of which polyurethane foams are an excellent example, used in accordance with the present invention are desirably of the type which afford a lattice-work or cellular structure having a multiplicity of interconnected cells or voids or, in other words, an open cell structure. Also, such a foam is desirably soft, resilient and flexible. Although the present invention will be described in terms of a polyurethane foam, it should be understood that other plastic foams having similar properties will serve as well.

Polyurethane foams are formed by the reaction between a plasticized polyester resin and an isocyanate. For example, one such polyurethane resin is formed by reacting a polyester resin, produced substantially from adipic acid and diethylene glycol, with tolylene diisocyanate or other poly-isocyanate and a suitable catalyst. The proportions of the ingredients are of course, carefully determined so that the final product will have interconnecting voids or cells. The reaction is performed in a vessel or sufficient size to contain the expanded or foamed plastic. When the reaction is complete, the loaf of plastic foam is removed from the vessel and cut into sheets. These sheets are then cut up into desired shapes by means of a punch or saw. The foam thus formed is a soft, resilient, flexible, highly porous material of spongelike characteristitcs and having a multiplicity of interconnecting voids or cells and, thus, a large internal surface area. Because the foam is easily compressible, the cut blocks or pieces of the plastic foam are easily insertable into a holder or other container. Accordingly, a piece of the foam is desirably cut to a size slightly larger than its container so that the foam piece will fit snugly within such container and thus prevent the channeling of gases around its outer surfaces.

I have found that polyurethane foams produced as described above are not completely satisfactory for use as a filter. This is believed to be caused by the fact that a large number of the cells making up the foam are not interconnecting. As a result, attempts to use the foam by cutting into shape immediately after it is produced have generally resulted in failure due to the fact that fluid flow rates through the filter are far too low for an economical and filtering action to take place.

For purpose of producing a highly efficient and effective filter from plastic foam I have discovered that the polyurethane foam can be proceesed to increase the number of interconnecting cells or voids without affecting its other desirable properties and, in fact, to enhance its filtering characteristics. To this end, I violently agitate a sheet of polyurethane foam by mechanical means.

Accordingly, this foam is crushed dry in order to produce an alternate squeezing and expanding action on it. After the foam has been violently agitated it is desirably flushed with oil to remove any loose particles which may have been broken away. This can be accomplished by squeezing the sheet of foam between rollers while it is immersed in an oil bath. When the excess oil retained in the sheet of foam from the oil bath has been squeezed out, the conditioned foam is drained of oil and is desirably cut into particular shapes or segments for use in various filter containers and applications. A sufficient amount of oil from the oil bath remains in the cells and on the cell walls to exhance the filtering action of the foam. One illustrative petroleum oil which has been found useful is SAE 30 lubricating oil.

I have found that solids and liquids entrained in gaseous materials, such as air, can be effectively and effciently removed by passing the contaminated gas through a filter medium comprising the polyurethane foam which has been treated by the method described. For example, it is necessary to filter the air employed in the combustible mixture of an internal combustion engine before it enters the engine's carburetor or fuel control device. In present use on many such carburetors are filter elements composed of aluminum wool coated with an oil or other substance for the purpose of entraining the impurities from the air before it enters the carburetor and engine.

As an example of the effectiveness of plastic foam filters treated in accordance with the present invention, filters made of such foam can be used for small internal combustion engines of the type used on power mowers for example, to increase the running time about 300% before the filter needs changing. When the aluminum wool filters become dirty, it is necessary to pry the aluminum wool out of its container and cleanse it in a solvent to remove both the oil and the entrained dust particles. The metallic filter must then be recoated with oil and forced back into the container. The shape of the wool is thus distorted causing a reduction in its usefulness as a filter.

The use of oil-impregnated foam filters produced by the present invention, on the other hand, achieves a substantial improvement in impurity retaining capacity over the oil-coated aluminum wool for the same volume flow of gas. For example, when an oil-impregnated foam filter treated by the method just described was used on the internal combustion engine of a power mower, it was found that the motor could be run for nine (9) hours before the filter needed cleaning as compared to a run of three (3) hours with the oil coated metal wool. The need for cleaning was determined by the loss of power or drop in r.p.m. of the engines. Upon examination of the engines it was found that those engines having the foam filters remained clean internally even after nine hours of continuous running.

It has been found that filters produced as described above can pass a gas flowing at a rate of approximately 1800 feet per second. The filtering efficiency of these foam filters is substantially 99% as compared to an efficiency of only 88% for the older type metal wool filters.

When an oil impregnated foam filter becomes dirty it is a simple matter to squeeze the filter under water and flush it out in a sponge-like manner. This effectively removes the entrained dirt particles without disturbing the oily impregnation in the cells of the foam filter. For certain applications it is desirable to use a soap-resistant silicone oil so that the filter can be washed with soap and water without removing the oil. The silicone oil, even when used in a very small amount with petroleum oil as the major impregnant, has been found to substantially increase the resistance of the foam and oil to soap and water. When the foam filter is washed, the oil remains trapped in the cellular structure of the foam and is not removed. The filter, after being dried, is ready for immediate use without further treatment or impregnation. The filters are inexpensive and efficient to use and last over a much longer period of time than the older metallic wool filters.

As an alternative method for increasing the effectiveness of polyurethane foam as a filter, I have discovered that by soaking the foam sheet in a weakening agent such as methylene chloride, xylol, or acetone, the foam is caused to expand in volume often as much as 50% again as large. The solvent expanded foam is then violently agitated by rolling or crushing. The foam thus treated exhibits improved filtering characteristics and an increased permissible flow rate of the fluid therethrough. It is believed that the precrushing expansion weakens the cell wall structure sufficiently to allow for an improved breaking action, resulting in an increased number of interconnecting cells. This method is shown diagrammatically in Figure 1.

Figure 2:
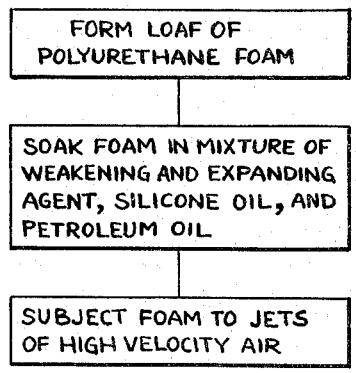
Fig. 2 illustrates diagrammatically a modified process embodying the invention.

As still a further method of improving the filtering characteristics of polyurethane foam or other plastic foam material, I have found that foam can be impregnated with 5% methylene chloride or xylol, 1% silicone oil and 94% petroleum oil. The foam thus impregnated is subjected to jets of high velocity air on its surface. The methylene chloride is believed to weaken the foam membranes or cellular walls so that the air jets can rupture them. The air jets also serve to blow excess oil out of the foam leaving the remaining oil to assist in the filtering action of the foam. This method is shown diagrammatically in Fig. 2.

Figure 3:
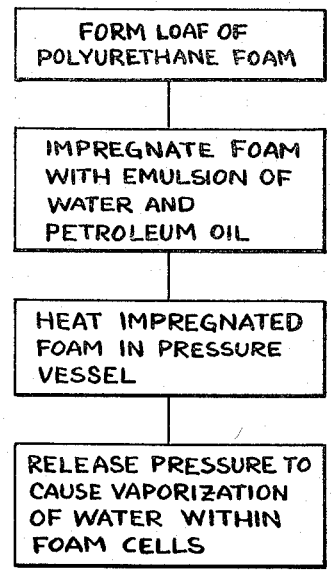
Fig. 3 illustrates diagrammatically a further modified process embodying the present invention.

Still another method of enhancing the filtering characteristics of foam plastics, such as polyurethane foam, involves impregnating the foam with an oil and water emulsion and placing it in a pressure vessel. The vessel with the emulsion impregnated foam is then heated to create a substantial internal pressure within the vessel and within the cells of the foam. Upon a rapid release of the pressure in the vessel to atmospheric pressure, the water in the foam cells is converted to steam and the rapid escape of this steam is believed to rupture the cell membranes. The oil is retained within the cellular structure of the foam and serves to enhance the filtering characteristics of the foam. This method is shown diagrammatically in Fig. 3.

A method for producing a highly efficient and effective filtering agent has thus been described. The plastic foam filter thus produced is both economical and simple to manufacture and has been found to be highly efficient for removing various types of solid impurities from fluids.

I claim as my invention:

1. The method of making a filter comprising reacting a mixture of polyester resin with an isocyanate to form a loaf of polyurethane foam having a cellular structure including a plurality of interconnecting cells, cutting the foam into sheets, impregnating the sheets with a mixture of about 5% methylene chloride, about 1% silicone oil and about 94% petroleum oil, subjecting the impregnated sheets to jets of high velocity air, and cutting the sheets to the desired shapes for filtering, said jets of air serving to rupture portions of the cellular structure thereby to form a greater plurality of interconnecting cells in the foam and to remove excess impregnant.

2. The method of making a filter comprising reacting a mixture of polyester resin with an isocyanate to form a loaf of polyurethane foam, having a plurality of interconnecting cells, cutting the foam into sheets, impregnating the sheets with an emulsion of water and petroleum oil, heating the impregnated foam in a pressure vessel, and releasing the pressure whereby the sudden vaporization of the water ruptures portions of the cellular structure thereby to form a greater plurality of interconnecting cells in the foam, said oil remaining in said cells to enhance the filtering action of said foam.

3. A method of making a filter for use in filtering fluids comprising the steps of forming a loaf of polyurethane foam, cutting said loaf into sheets, saturating said sheets of foam with a weakening agent capable of expanding the foam to weaken its cell wall structure, squeezing out the weakening agent, violently agitating the weakened foam including mechanically squeezing the same, and cutting said agitated sheets into predetermined sized segments for filtering.

4. A method of making a filter for use in filtering fluids comprising the steps of forming a loaf of polyurethane foam, cutting said loaf into sheets, of saturating the foam with a weakening agent capable of expanding the foam to weaken the cell wall structure, violently agitating the sheets by squeezing and rolling, flushing said sheets by squeezing the same in a bath of flushing fluid, draining said sheets of excess fluid, and cutting said expanded, agitated, and flushed sheets into predetermined sized segments for filtering.

5. A method of making an open celled polyurethane foam filter for use in filtering a fluid to remove solid particles entrained therein, comprising forming a polyurethane plastic foam, soaking said foam in a weakening agent selected from the group consisting of methylene chloride, xylene, and acetone, violently agitating said solvent soaked foam by compressing and rolling the same, flushing said agitated foam with a filtering oil by squeezing the foam in a bath of said oil, and draining said oil from said foam thereby to produce a foam having a plurality of interconnecting cells including a sufficient amount of filtering oil therein to enhance the filtering action of the foam.

6. A method of making an open celled polyurethane foam filter for use in filtering a fluid to remove solid particles entrained therein, comprising forming a polyurethane plastic foam, soaking said foam in a weakening agent capable of expanding the foam to weaken its cell wall structure, and violently agitating the weakened foam by mechanically working the same thereby to increase the number of interconnecting cells therein.

References Cited in the file of this patent

UNITED STATES PATENTS

| | | |
|---|---|---|
| 1,045,234 | Willis et al. | Nov. 26, 1912 |
| 2,327,001 | Schott | Aug. 17, 1943 |
| 2,670,500 | Eusslin et al. | Mar. 2, 1954 |
| 2,729,618 | Muller et al. | Jan. 3, 1956 |
| 2,732,356 | Paxton | Jan. 24, 1956 |
| 2,770,241 | Winkler | Nov. 13, 1956 |

OTHER REFERENCES

"From Jets to Jewels," by Betty Lou Raskin, Chemical and Engineering News, May 21, 1956, pp. 2492–2497.

"Current Developments in Foamed Polyurethanes," British Plastics, January 1956, pp. 5–9 and 39.